(12) United States Patent
Ng

(10) Patent No.: US 6,328,570 B1
(45) Date of Patent: Dec. 11, 2001

(54) PORTABLE KARAOKE UNIT

(75) Inventor: Kai Kong Ng, Singapore (SG)

(73) Assignee: Cyberinc Pte Ltd. (SG)

( * ) Notice: Subject to any disclaimer, the term of this patent is extended or adjusted under 35 U.S.C. 154(b) by 0 days.

(21) Appl. No.: 09/095,179

(22) Filed: Jun. 10, 1998

Related U.S. Application Data

(60) Provisional application No. 60/078,726, filed on Mar. 20, 1998.

(51) Int. Cl.$^7$ ................................................. G09B 5/06
(52) U.S. Cl. ..................... 434/307 A; 434/309; 434/318
(58) Field of Search ........................ 434/307 A, 309, 434/318; 84/610, 609

(56) References Cited

U.S. PATENT DOCUMENTS

| | | |
|---|---|---|
| D. 290,119 | 6/1987 | Trezise et al. . |
| D. 310,078 | 8/1990 | Naito . |
| D. 372,714 | 8/1996 | Pinchuk . |
| 5,349,480 | 9/1994 | Takao . |
| 5,383,079 | 1/1995 | Takao . |
| 5,408,686 | 4/1995 | Mankovitz . |
| 5,465,240 | 11/1995 | Mankovitz . |
| 5,561,849 | 10/1996 | Mankovitz . |
| 5,606,143 | 2/1997 | Young . |
| 5,609,486 * | 3/1997 | Miyashita et al. ........... 434/307 A X |
| 5,648,628 | 7/1997 | Ng et al. . |
| 5,712,949 | 1/1998 | Kato et al. . |
| 5,808,224 * | 9/1998 | Kato ................................. 84/609 X |
| 5,810,603 * | 9/1998 | Kato et al. .................... 434/307 A X |
| 5,824,934 * | 10/1998 | Tsurumi et al. ................... 84/609 X |

* cited by examiner

*Primary Examiner*—Valencia Martin-Wallace
*Assistant Examiner*—Chanda Harris
(74) *Attorney, Agent, or Firm*—Townsend and Townsend and Crew LLP

(57) ABSTRACT

A portable, programmable karaoke unit that is flexible in its use. Data may be stored and retrieved in compressed digital data format from an internal memory or a removable storage medium. The unit is operable by remote control and transmits audio data over radio frequencies. It may display visual data on an internal or external display. Data can be downloaded for storage from external sources such as a digital system or the Internet.

38 Claims, 8 Drawing Sheets

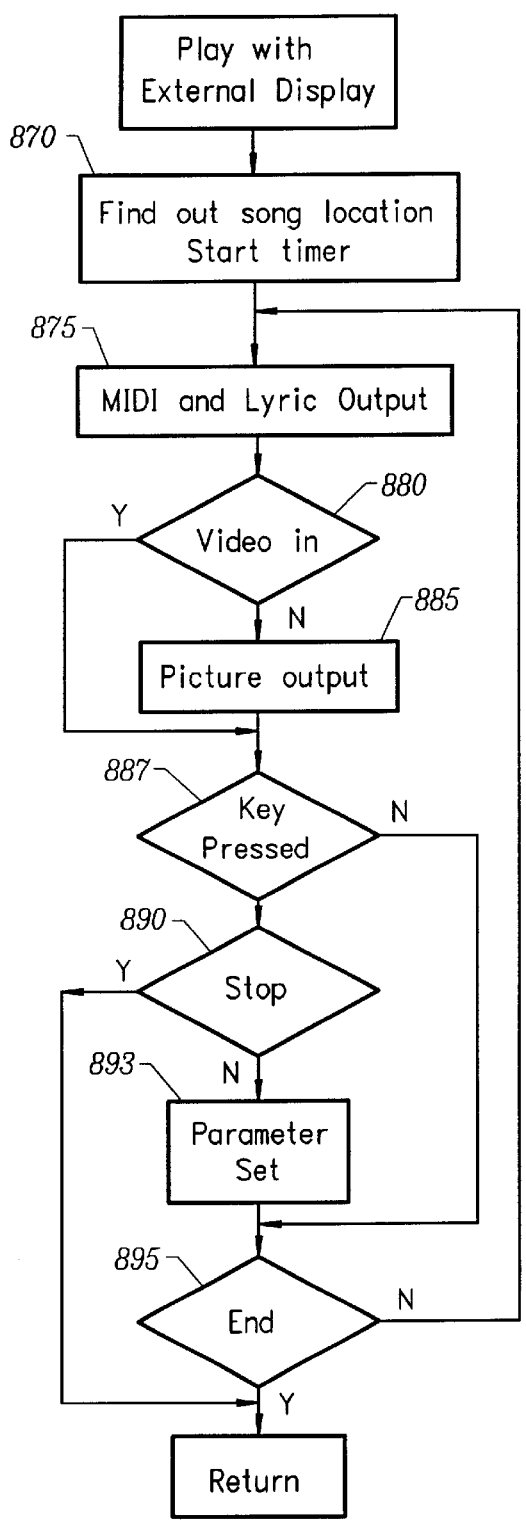
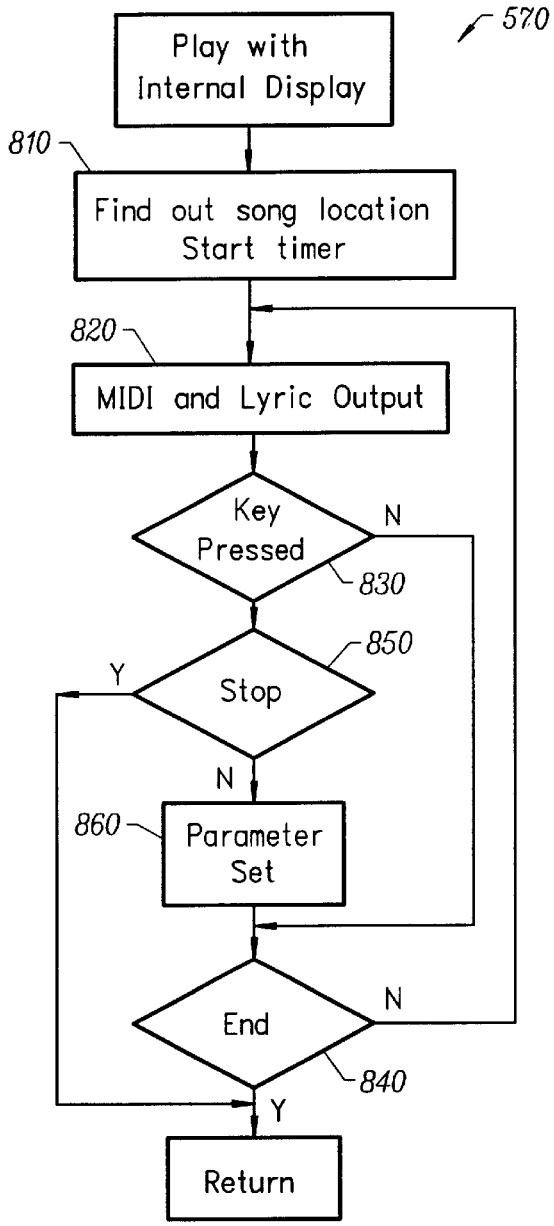
FIG. 8B
FIG. 8A

PORTABLE KARAOKE UNIT

CROSS REFERENCE TO RELATED APPLICATIONS

The present invention claims the benefit of Provisional Patent Application No. 60/078,726, filed Mar. 20, 1998 entitled "PORTABLE KARAOKE UNIT", which is incorporated herein by reference for all purposes.

BACKGROUND OF THE INVENTION

The present invention relates to music reproduction, and more specifically to a portable karaoke unit for playing music while displaying corresponding graphics and lyrics.

Karaoke singing has become a popular activity across many segments of society. A so-called karaoke unit reproduces music from popular songs and allows users to sing along into a microphone and mix their voices with the music. To prompt the singers, the karaoke unit displays the lyrics to the song on a screen. The lyrics will often be highlighted or otherwise give cues to the singers as to when each word of the lyrics is to be sung. Graphic or video images may also be displayed along with the lyrics.

Existing karaoke units have been somewhat limited in their operation. For example, existing systems store data on only one type of storage medium, either a memory integrated in the unit or one that is removable from the unit. Further, the data on the media was not programmable by the user, so users were limited in their options for obtaining and altering song and program data on the storage medium.

Due to the nature of karaoke systems, portability is a key element for their usefulness to users. In the past, systems have been large and bulky. While sometimes it is convenient to use large, high quality peripheral equipment such as displays and amplification systems, other times it is more desirable to have a unit that is easy to carry about without cables and external equipment.

In general, it is desirable to provide a karaoke machine that is flexible in the manner in which it may be used. Accordingly, a portable karaoke unit that does not have the limitations of existing systems is desirable.

SUMMARY OF THE INVENTION

The present invention provides a portable karaoke unit that is more flexible than existing systems. It may operate as a portable unit, or be coupled to conventional external equipment.

In an embodiment of the present invention, song and program data may be stored and retrieved from different sources including an integrated memory and removable storage mediums. The karaoke unit reads the data from either type of media and converts it to audio and visual signals. The visual signals may be displayed on either an integrated internal display, or on an external display. The visual signals may include graphic images stored in the storage medium, or video images from an external source. Audio signals may be output over conventional means such as speakers or headsets, or transmitted wirelessly over radio frequencies. The karaoke unit may be controlled either by a portable keypad built into the unit, or by a remote control device.

In another embodiment of the present invention, the removable storage medium is programmable, so that users may program new data or edit existing data on the removable storage medium. Data can be downloaded from a variety of sources such as personal computers and the Internet for storage on the removable storage medium. Music data may be stored in compressed format, such as MIDI data which is widely used in the industry for storing and manipulating musical data. Other compression formats such as LZW or other formats may also be used.

In another embodiment, program data such as game programs may be stored on the internal memory or on the removable storage medium. Control of the karaoke unit's processor is transferred to the program according to a user's commands.

Other objects, features, and advantages of the present invention will become apparent upon consideration of the following detailed description and the accompanying drawings, in which like reference designations represent like features throughout the figures.

BRIEF DESCRIPTION OF THE DRAWINGS

FIG. 8A is a flow diagram of a subroutine for playing a song on an internal display unit;

FIG. 8B is a flow diagram of a subroutine for playing a song on an external display unit;

DETAILED DESCRIPTION OF THE SPECIFIC EMBODIMENT

Figure 1A:
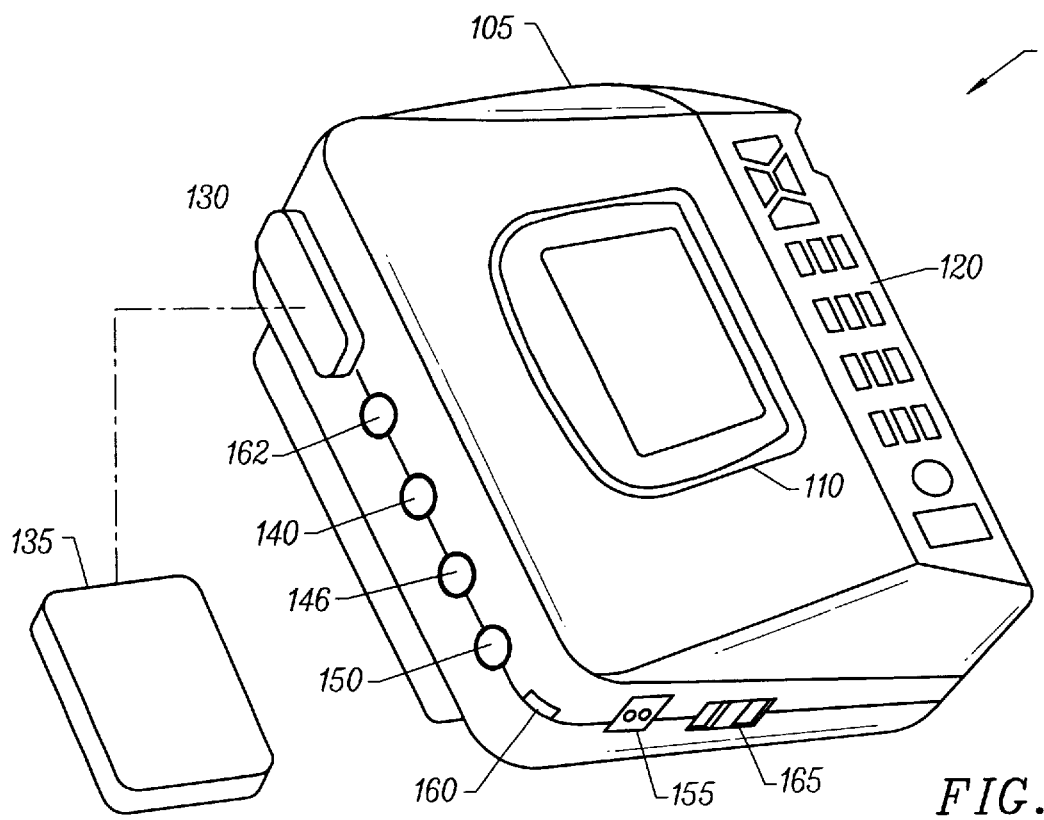
FIG. 1A is a front view of a portable karaoke unit of the present invention.
Figure 1B:
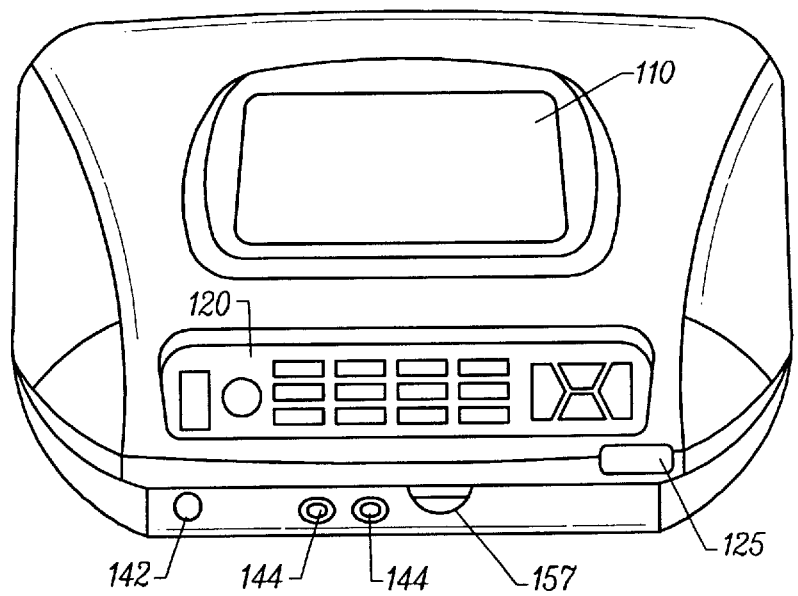
FIG. 1B is a back view of a portable karaoke unit of the present invention.

FIGS. 1A and 1B are perspective views of the front side and back side, respectively, of a portable karaoke unit 100 of the present invention. Karaoke unit 100 resides in a casing of convenient size for being carried portably by the user. In the specific embodiment, it is substantially rectangular in shape, although other shapes and sizes may also be preferably used. The size and shape are designed for convenient use and aesthetic appeal.

An internal display 110 is affixed to the top of karaoke unit 100. It is used to display lyrics and images to the user during the operation of karaoke unit 100. In the specific embodiment, internal display 110 is a black and white liquid crystal display (LCD) with 122×32 pixel resolution. It includes an 8051 compatible microcontroller with an 8-bit data bus, address bus, and control signals for read and write operations. Of course, other types of display screens may be preferably used, also. The LCD display of the specific embodiment is advantageous in that it uses a relatively small amount of power, thereby extending battery life over a less efficient type of display. However, as technology improves, other displays now known or later developed may become more advantageous and are anticipated for use with the present invention. In the specific embodiment, internal display 110 primarily displays lyrics and other textual information; however, in alternative embodiments, internal display 110 may also display graphic and video images.

Karaoke unit 100 also has a keypad 120. Keypad 120 provides an input mechanism for the user to send control commands to karaoke unit 100. Keypad 120 is preferably a set of keys that perform common functions such as song play, pause, stop, song number selection, key control, tempo control, volume control, game controls, and menu selection. A remote control receiver 125 is also included. Remote control receiver 125 allows a user to input similar commands from a remote control device (not shown) having a similar set of keys.

A removable storage interface 130 is also provided in karaoke unit 100. Removable storage interface 130 allows a cartridge 135 to be inserted into karaoke unit 100. Although referred to herein as a cartridge, cartridge 135 may be any removable, nonvolatile memory capable of storing digital data. Cartridge 135 stores song data, including audio data, lyrics, timing information, and graphic image data. It may also store program data such as game programs and the like. In the specific embodiment, cartridge 135 is an integrated circuit cartridge, although other storage media such as compact disks, DVDs, computer diskettes, and the like may also be used. Cartridge 135 is preferably programmable so a user may store new data or edit existing data. The data on cartridge 135 is preferably compressed to allow more data to be stored. Any of the many types of compression methods may be used including lossless and lossy types of compression, although it will be recognized that some compression methods are more appropriate for certain applications.

Though it is designed to be portable, karaoke unit 100 has several input/output ports for coupling to external devices. These input/output ports include an audio output port 140, a headphone output port 142, two microphone input ports 144, a video output port 146, a video input port 150, and a power port 155. Each of these are standard connectors that couple to various external devices as is well known in the art. The specific embodiment has two separate microphone input ports 144 allowing two singers to have microphones, although any number of microphone ports 144 may be included. A contrast adjuster 157 allows the user to adjust the contrast on internal display 110.

An antenna 160 is also provided. Antenna 160 allows audio signals to be broadcast over FM frequencies for reception by an external FM receiver. Design of an FM antenna is well known and any appropriate antenna design may be used.

A communication port 162 allows data to be downloaded into karaoke unit 100. In the specific embodiment, communication port 162 is an RS-232 interface, the details of which may be found, for example, in the EIA-232 specification as is well known in the art. In an alternative embodiment, a Universal Serial Bus interface is provided, although other serial or parallel interfaces may also be used without departing from the spirit and scope of the present invention. Electricity is supplied from power port 155 or from a battery (not shown). A 3-position power/display selector switch 165 is provided to allow a user to turn karaoke unit 100 on and off, and to use either internal display 110 or an external display for displaying images.

Figure 2:
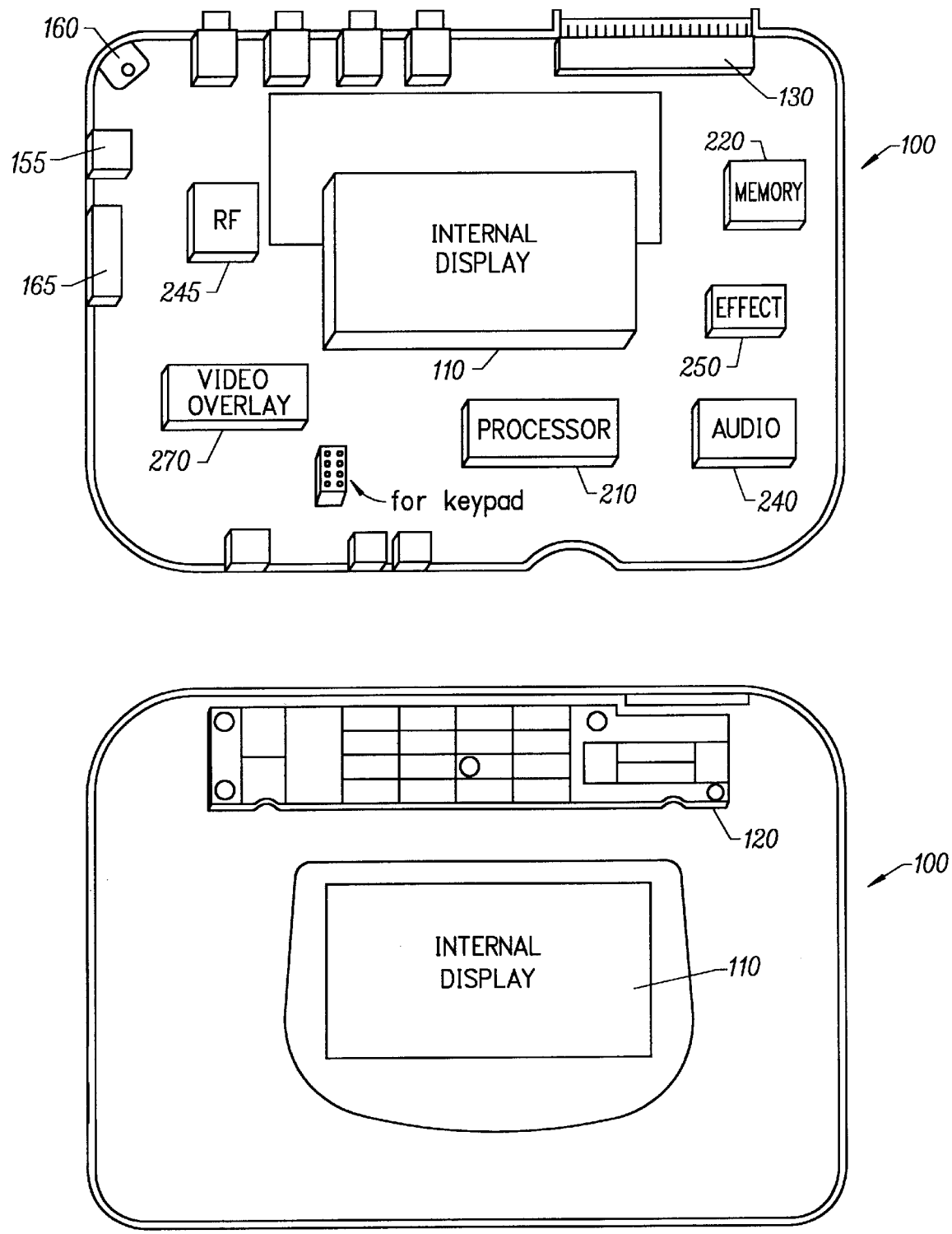
FIG. 2 is a block diagram showing the major components on the front and back side of a printed circuit board in the specific embodiment of the present invention.

FIG. 2 shows a printed circuit board with various components that make up karaoke unit 100. A processor 210 is the main controller of karaoke unit 100 and controls the operation of all the other modules according to a program and inputs from the user. While processor 210 may be any general purpose microcontroller, the specific embodiment uses a 16-bit microcontroller. Other controllers now known or later developed may also be preferably used. Details of other components shown in FIG. 2 will be described functionally with respect to FIG. 3, below.

Figure 3:
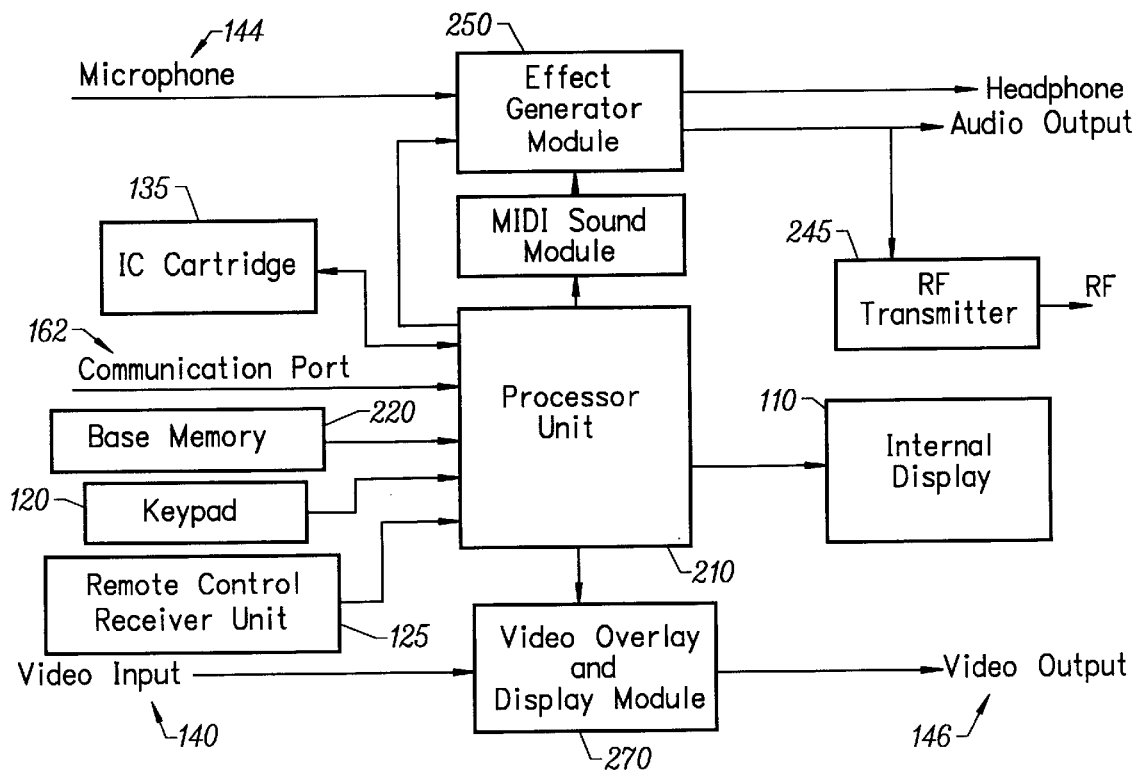
FIG. 3 is a functional block diagram of a karaoke unit of the present invention.

FIG. 3 is a functional block diagram showing the interaction of various elements of karaoke unit 100. Processor 210 controls the operation of karaoke unit 100 by execution of a program stored in memory 220. It receives user commands from keypad 120 or from remote control receiver 125. A primary function of processor 210 is to transform song data into its various parts for reproduction, including music, the corresponding lyrics for the music, graphic images, and timing information for their reproduction and display. In the specific embodiment, the song data is compressed to enable more data to be stored in a given area of storage. Processor 210 decompresses the song data, although in some embodiments the decompression may be done with hardware assistance. Processor 210 may also execute programs that are stored on cartridge 135 or memory 220 at the request of the user, such as game programs and the like.

Karaoke unit 100 has two modes for displaying visual images. In internal mode, the lyrics are displayed on internal display 110. The processor relies on timing information in the song data to determine when the lyrics are to be displayed. In external mode, the processor outputs the lyrics on video output port 146 for display on an external display (not shown) such as a television. Graphic images from the song data, or video images from video input port 150 may be combined with the lyrics and displayed on the external display. In other embodiments, the same information may be output on both types of displays.

Memory 220 is coupled to processor 210. It may comprise both ROM and RAM components. The main program that processor 210 executes when karaoke unit 100 is powered on is typically stored in the ROM component. Memory 220 may also store song data including music data, lyric data, lyric timing information, and graphic images. Typically, the song data is compressed to save space. Processor 210 retrieves song data from memory 220 as it is needed. Other programs, such as game programs, may also be stored in memory 220.

Song data and program data are also stored in cartridge 135. In the specific embodiment, cartridge 135 is an integrated circuit memory module that may be inserted into removable memory interface 130. This allows users to purchase cartridges with song, programs, and/or graphics for use in their karaoke unit. The data in cartridge 135 is similar to that stored in memory 220. In one aspect of the present invention, processor 210 may retrieve song data, graphic images, or program data either from memory 220 or from cartridge 135. Processor 210 may automatically choose to retrieve data from cartridge 135 if it is found to be present in removable storage interface 130, or the user may have an option to select whether processor 210 extracts data from memory 220 or from cartridge 135.

Figure 4:
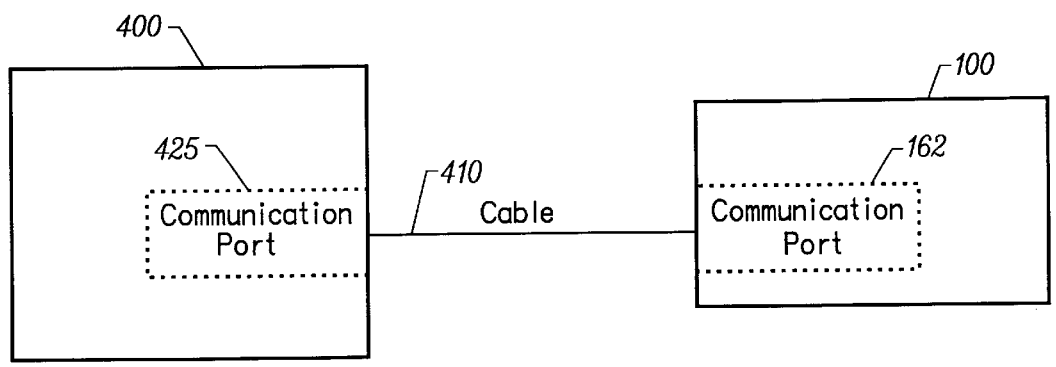
FIG. 4 shows a karaoke unit of the present invention coupled to a digital system for programming the karaoke unit.

Cartridge 135 is preferably programmable. That is, a user may store new data or edit existing data on cartridge 135. FIG. 4 shows an exemplary system for downloading data for storage in cartridge 135. A digital system 400 is coupled to karaoke unit 100 by means of a cable 410. Communication port 162 provides a connector and performs the handshaking protocol for the data transfer. In the specific embodiment, communication port 162 is a Universal Serial Port as is found on many personal computers. In other embodiments, it may be an RS 232 interface, an IRDA interface, an RF interface, or a variety of other communication interfaces, both serial and parallel. Digital system 400 also has a communication port 425 for coupling to cable 410.

FIG. 4 depicts a simple downloading system with a direct connection, but many switches and systems may be located between digital system 400 and karaoke unit 100. Digital system 420 may be, for example, a personal computer as is well known in the art, a set top box specifically designed to download data to karaoke unit 100, or a computer or other device that is connected to the Internet to allow data to be downloaded from the Internet to cartridge 135. Further, digital system 420 may be used to edit data on cartridge 135 using communication port 162 as will be described below with respect to FIG. 7

Referring again to FIG. 3, a sound module 240 is coupled to processor 210. Processor 210 retrieves song data from one of the memories and outputs the audio portion to sound module 240 in MIDI format. Sound module 240 transforms the MIDI information into a stereo music signal that can be played on conventional sound systems. Sound module 240 may be, for example, a Yamaha or other compatible wave table synthesizer. It generates 16-bit stereo sounds using either an internal or external wave table, as is known in the industry. Operating at a 44.1 kHz sampling rate, the sound module outputs very high quality sounds. Of course, depending on the application, other methods of transforming the MIDI information into stereo sound may be implemented, or other formats other than MIDI may be used.

Effects generator 250 is coupled to the output of processor sound module 240. It is also coupled to microphone input port 144, through which it may be coupled to one or more microphones (not shown) or other audio input devices. In some embodiments, one of the microphones (not shown) may be included within the casing of karaoke unit 100. Effects generator 250 receives voice data from the microphones and incorporates sound effects such as echo, reverb, and the like. The amount of echo, reverb, and volume is controlled by processor 210 according to user commands. Effects generator 250 also mixes the altered voice data with the output from sound module 240 and outputs the mixed sound through audio output port 140, headphone output port 142, and/or a radio frequency transmitter 245. In the specific embodiment, radio frequency transmitter 245 is an FM transmitter, so it frequency modulates the audio signal and transmits it through antennae 160.

Processor 210 performs video processing of graphic images and video images in conjunction with a video overlay and display module 270. Video overlay and display module 270 receives lyric data and graphic image data from processor 210 and a video signal from video input port 150. It translates the lyric data into characters for display by generating the specified font. The characters are overlaid on either the graphic images or on the video signal and output on video output port 146. Of course, if it is operating in internal display mode, then the characters are output to internal display 110. In the specific embodiment, video overlay and display module 270 is a Yamaha or compatible graphics processor and a Rohm video overlay and encoder. It outputs an analog RGB video signal, although any of the other analog or digital video formats may also be employed such as YUV, etc.

Figure 5:
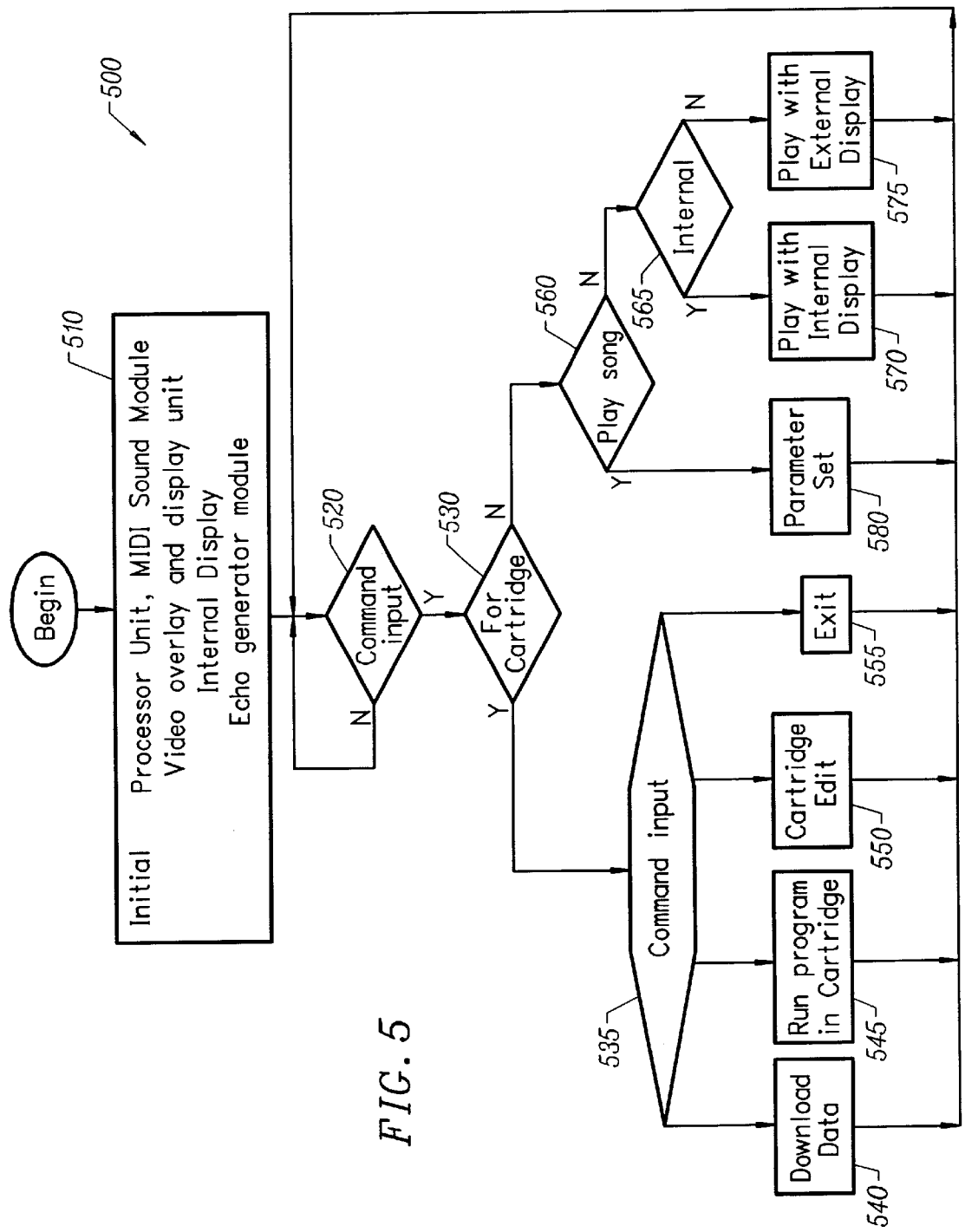
FIG. 5 is a flow diagram of the main program of a karaoke unit of the present invention.

FIG. 5 is a high-level flow diagram of a main program 500 executed by processor 210 whenever karaoke unit 100 is powered on. When karaoke unit 100 is turned on initially, the main program 500 automatically begins execution at step 510. In step 510, various components of karaoke unit 100 are initialized, including processor 210 sound module 240, video overlay and display unit 270, internal display 110, and effects generator 250. In step 510, processor 210 examines the position of the power/display selector switch 165 to determine whether to operate in internal or external display mode.

After initialization step 510, processor 210 advances to step 520. In step 520, processor 210 waits for a command to be input by the user. A command may be input, for example, by means of keypad 220 or remote control receiver 125. Exemplary commands include, for example, "display cartridge operation", "play song", "volume up", "volume down", "skip forward", "skip backward", "stop", "program songs" (i.e., preselect a series of songs to be played,) and a variety of other commands that will be recognized by one of skill in the art. If no command is input, then processor 210 stays in step 520 until a command is input. When processor 210 senses a command, then it advances main program 500 to step 530.

In step 530, processor 210 determines whether the command is a cartridge command or a song command. If the command is for a cartridge operation, then in step 535, processor 210 outputs a menu on the selected display unit. The menu includes choices of operations that the user may request for operating on cartridge 135. Exemplary menu choices include "download," "run cartridge program," "edit cartridge," and "exit cartridge menu." Processor 210 waits in this step until the user selects one of the menu choices. When a choice is selected, processor 210 advances to the proper step according to the selection. For example, if the user select "download," then processor 210 advances to step 540 (described below with respect to FIG. 6). If the user selects "run cartridge program," then processor 210 advances to step 545 and executes the program stored on the cartridge. This program may be, for example, a game program. Similarly, if the user selects "edit cartridge," then the processor advances to step 550 (described below with respect to FIG. 7). Finally, if the user selects "Exit Cartridge Menu," then processor 210 will return to step 520 to await another user command.

Referring again to step 530, if the input is not a cartridge command, then processor 210 moves to step 560. In step 560, it determines whether the command is a command to play a song or a command to set the parameters of karaoke unit 110. If it is a command to play a song, then processor 210 enters step 565 where it examines whether it is in external or internal display mode. If it is in internal display mode, processor 210 executes step 570 (described below with respect to FIG. 8A.) If it is in external display mode, then it executes step 575 (described below with respect to FIG. 8B.) After executing steps 570 or 580, then processor 210 returns to step 520 where is awaits another user command.

Referring again to step 560, if the command is something other than a play song command, then processor 210 executes step 580. In step 580, the user can adjust several parameters. For example, the user can set the volume or the key and tempo controls of the song, the user can program a series of songs to play in sequence, control the display of lyrics in the display, and other operations. After each command is complete, processor 210 returns to step 520 where it awaits the next command. If the user has programmed a series of songs, then in step 520, the command to play the next song will be automatically entered by processor 210, rather than the user.

Figure 6:
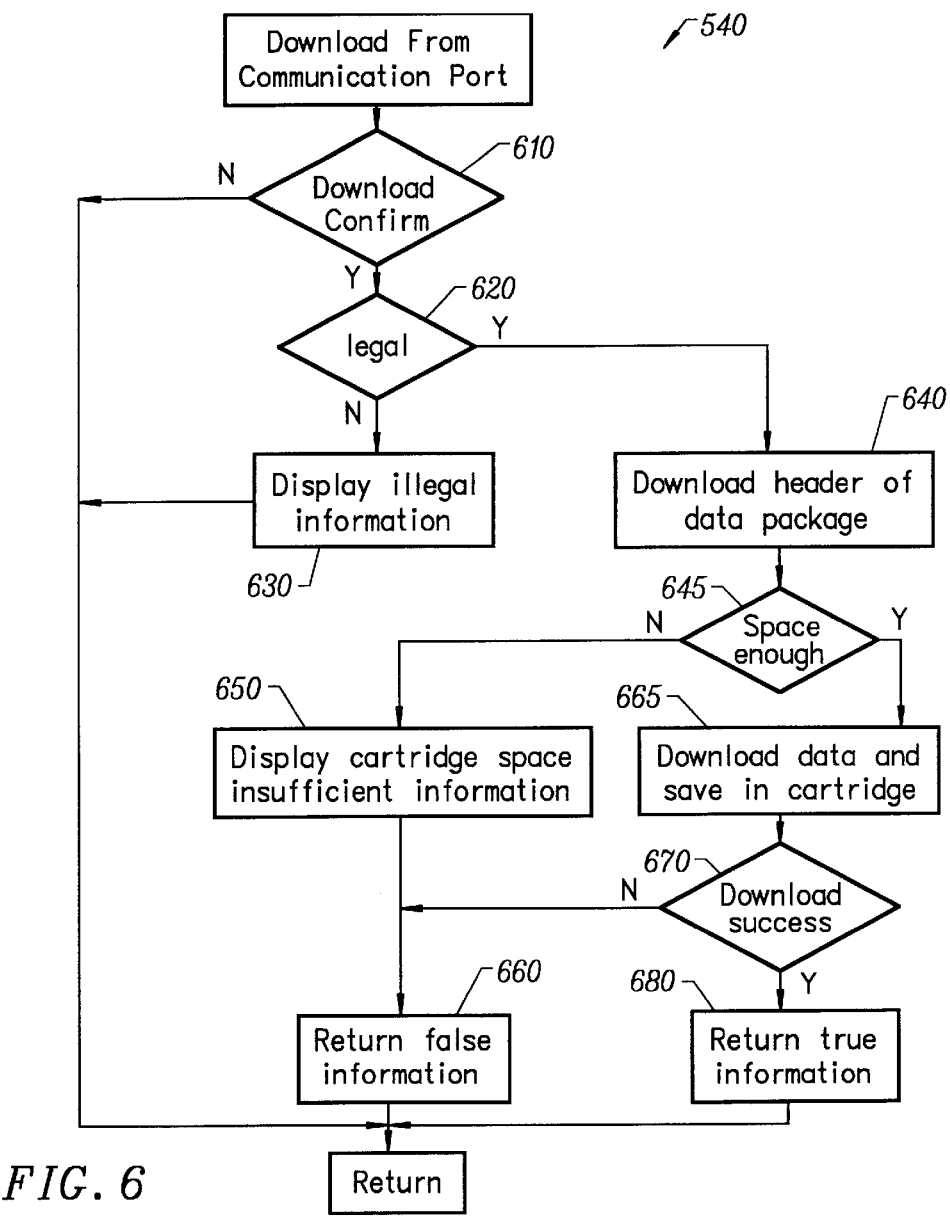
FIG. 6 is a flow diagram of a subroutine for downloading data to the karaoke unit.

FIG. 6 is a flow diagram showing more detail about step 540 in which song or program data is downloaded to cartridge 135 through communication port 162. When processor 210 recognizes a command from the user to download data, it advances to step 610 in which it prompts the user to confirm that a download is intended. If the user responds that it was not intended, then the procedure ends. Otherwise, processor 210 advances to step 620.

In step 620, the processor determines whether the download operation is legal or not. A download operation is not legal if, for example, cartridge 135 is not a compatible cartridge, identification information stored on cartridge 135 is invalid, or cartridge 135 is write protected or is a read-only type memory storage medium. If it is not legal, then in step 630, karaoke unit 100 displays information about the illegal operation and the routine ends. If the operation is legal, then it begins the downloading of a data package. The data package may contain a header, a data field, and a trailer, although some embodiments may include different fields. The header contains information about the data such as its size, whether it is compressed, the number of pad bits at the end of the data, and the like. The data field contains the actual data, and the trailer contains information such as error detection or error correction information.

In step 640, the data is downloaded into processor 210. From the header information, processor 210 can determine in step 645 whether there is enough space in cartridge 135 to store the data in the data field. If there is not enough space, then in step 650 information about the cartridge space is displayed on whichever screen is selected. Then, in step 660, a message stating that the operation failed is displayed and the routine ends.

Referring again to step 645, if there is enough storage space available for the entire packet, then in step 665, the data field is downloaded into removable cartridge 135. After all the data has been downloaded in step 670, the method determines if the download completed successfully. This may be done by a variety of known error detection techniques for example, parity checking, CRC checking, and the like. Error detection information may be included in the trailer field. If an error is found, then processor 210 advances to step 660 in which an error message is displayed and download step 540 ends. On the other hand, if the download is determined to be successful, then a message is displayed in step 680 confirming the successful download and download step 540 ends.

Although not shown, step 670 may be expanded to include error correction as well as error detection. Numerous error correction methods are well known and any appropriate method may be included in step 670.

Figure 7:
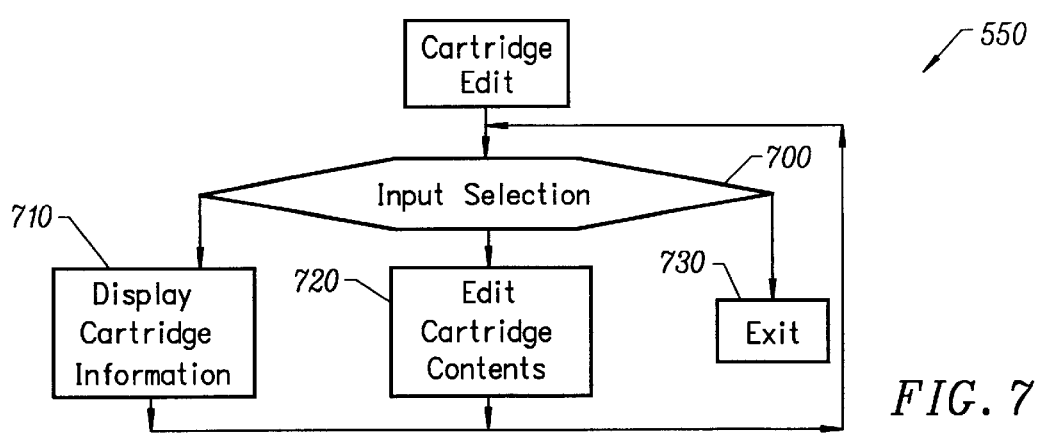
FIG. 7 is a flow diagram of a subroutine for editing data in a cartridge.

FIG. 7 shows more details of cartridge edit step 550. In step 700, the processor 210 waits for editing commands from the user. If the command is a display status command, then in step 710, the cartridge information such as cartridge ID, capacity, table of contents, and other relevant information are displayed on whichever display has been selected. After displaying the information, then the routine returns to input selection step 700 to await another command. If the input command is a cartridge edit command, then the routine advances to step 720 where the editing of the cartridge is completed. This may be done, for example, by downloading new data for some or all of the cartridges over communication port 162. Editing commands include downloading a new data item, deleting a data item, and deleting the cartidge contents. When editing step 720 is complete, then the routine again returns to step 700 to await another selection. The routine remains in editing step 550 until the user decides to exit, at which time step 730 executes, which ends editing step 550.

FIG. 8A is a flow diagram showing more details of step 570 in which a song is played with the lyrics being displayed on internal display 110. In step 810, the first step after the play song command is entered, processor 210 determines the song location in the memory and begins a timer. The song data may be located either in memory 220 or in cartridge 220. The timer is used by processor 210 in determining when to output the lyrics.

In step 820, processor 210 retrieves the song data and decompresses it. From the decompressed song data, processor 210 extracts the music data and outputs it in MIDI format to sound module 240. It also extracts the lyric data and sends it to internal display 110 for display. The timer is used to determine at what point in the music the lyrics are to be displayed, and highlighted. Processor 210 continually outputs music and lyrics until it detects that the user has entered a command (step 830) or it detects that the end of the song has been reached (step 840.)

If the user has entered a command, for example, by pressing one of the keys on keypad 120 or a remote control device, then processor 210 determines whether the command is one which indicates that the song should stop. Commands that stop the song include, "stop", "advance to next track", etc. In step 850, the key is examined to see if it is one of the stop commands and if it is, then step 570 ends. If the command is not a stop command, then it is likely a parameter set command such as volume control, pause, key changes, tempo control, and the like. In step 860, the command, whatever it is, is executed and then the song continues to the end or until another key is pressed. At the end of the song or a stop command, step 570 ends.

FIG. 8B shows more detail of step 575 in which a song is played with the lyrics and an image being displayed on an external display unit such as a television set. First, in step 870 processor 210 finds the song location in the memory and starts the timer. Again, the song data may be found in memory 220 or in cartridge 135. Graphic image data may also be stored in memory 220 or in cartridge 135.

In step 875, processor 210 retrieves the song data and decompresses it. From the decompressed song data, processor 210 extracts the music data and outputs it in MIDI format to sound module 240. It also extracts the lyric data and sends it to video overlay and display module 270. The timer is used to determine at what point in the music the lyrics are to be displayed, and highlighted. Processor 210 continually outputs music and lyrics until it detects that the user has entered a command (step 887) or it detects that the end of the song has been reached (step 895.)

Step 880 determines if there is a video input on video input port 150. If there is a video input, it mixes the video input with the lyric data in video overlay and display module 270 and outputs the combined image on video output 146. If there is no video image on video input 150, then the picture is decompressed from the graphic image in either memory 220 or cartridge 135. The graphic image is overlaid by the lyric data in video overlay and display module 270 and the combined image is output on video output 146. This data output continues until either a key is pressed or the song ends.

Processor 210 determines the various user inputs in a manner similar to steps 830 to 860 in FIG. 8A and step 575 ends under the same conditions in steps 887 to 895.

Figures 9A, 9B:
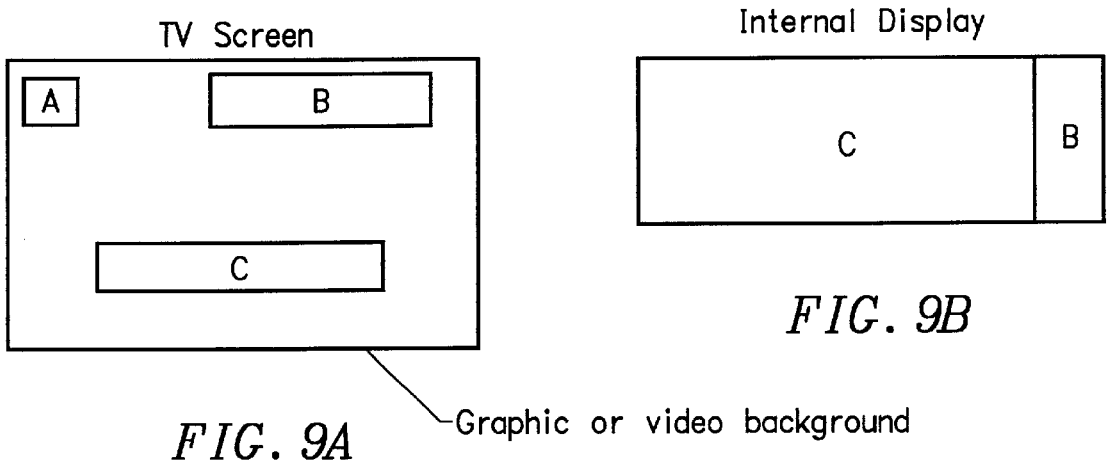
FIG. 9A is a diagram of an external display screen immediately after initialization of the karaoke unit.
FIG. 9B is a diagram of an internal display screen immediately after initialization of the karaoke unit.

FIG. 9A is a diagram depicting how an external display screen may appear immediately after initialization step 510 in FIG. 5 is performed. The screen remains in this state until a command is input by the user. Of course, different screen layouts and content may be substituted for that shown, without departing from the spirit and scope of the present invention.

The area marked A on the screen displays product information about karaoke unit 100. For example, it may include a logo or trademark of the company that produced karaoke unit 100. In the area marked B, the results of the current command execution from step 520 is displayed, and in area C the product name and/or the various alternative command input prompts may be displayed. In the specific embodiment, the product name and command input prompts alternate in area C.

FIG. 9B shows a diagram of internal display 110 after the initialization. Here, areas B and C contain the same information as described with respect to FIG. 9A, but they are displayed with area B in the region at the right edge of internal display 110, and area C filling the remainder of the screen. The layout of internal display 110 is simpler than the layout of the external display, because in the specific embodiment, a black and white LCD display is used that does not have the color and high resolution of the external display. However, a high resolution color screen may be used as internal display 110, and the layout described for the external display in FIG. 9A and other diagrams discussed below may be more appropriate.

Figures 10A, 10B:
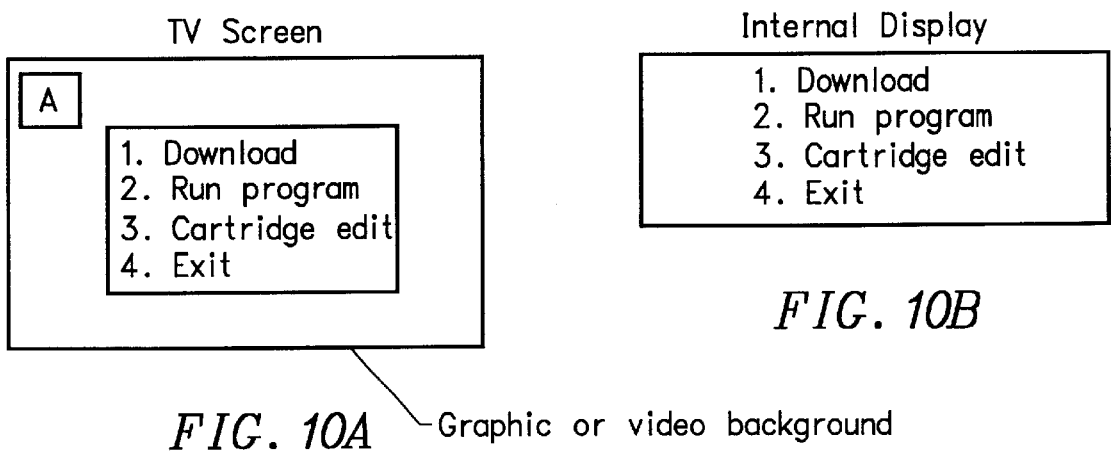
FIG. 10A is a diagram of an external display screen during display of the cartridge operations menu.
FIG. 10B is a diagram of an internal display screen during display of the cartridge operations menu.

FIGS. 10A and 10B are diagrams of how the internal and external displays may appear during the display of a cartridge menu during the operation of main program 500, for example, step 535 of FIG. 5. Here, the menu choices are displayed as shown in each of the screens. The logo of the company is displayed in area A of the external display as described above with respect to FIG. 9A. Of course, if other cartridge editing commands are implemented in an alternative embodiment, the other commands may be displayed as menu choices on the screen, also.

Figure 11A:
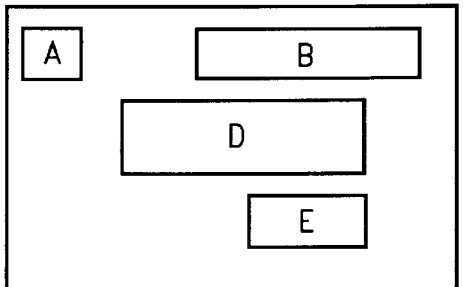
FIG. 11A is a diagram of an external display screen at the beginning of a song.
Figure 11B:
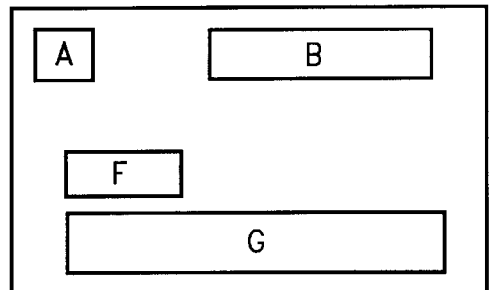
FIG. 11B is a diagram of an external display screen during the playing of a song.

FIGS. 11A–11B are diagrams of the appearance of the external display throughout the playing of a song. In the background, a graphic image or video image is displayed on the whole screen. Areas shown in white in the figure are overlays on top of the graphic or video images. Again, area A displays the logo of the company. Area B displays the results of the last command from step 520.

FIG. 11A is a diagram of the external display at the beginning of a song. In area D, the song title is displayed. Area E displays the credits for the song, such as the names of artist, the producer, or the song writer. After the song has begun, this information goes away to be replaced as shown in FIG. 11B.

FIG. 11B is a diagram of the external display during the playing of the song. Area F displays a prompt to the signer with information about when to start singing. Area G displays the song lyrics. Often, the song lyrics will be highlighted at the time that they are to be sung.

Figure 12A:
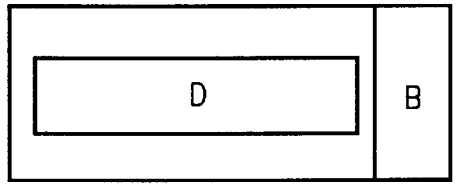
FIG. 12A is a diagram of an internal display screen at the beginning of a song.
Figure 12B:
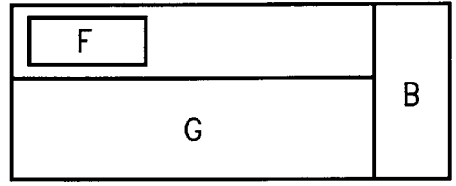
FIG. 12B is a diagram of an internal display screen at the time the user is to start singing.
Figure 12C:
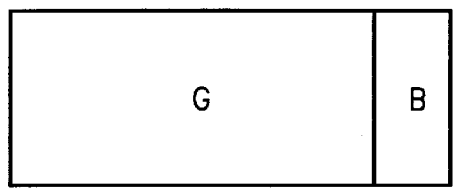
FIG. 12C is a diagram of an internal display screen during the playing of a song.

FIGS. 12A–12C are diagrams of the appearance of internal display 110 as a song is played. Area B displays the results from the last command execution of step 520. FIG. 12A shows that at the start of song play, the song title is displayed in the area marked D. FIG. 12B shows that when it is time to start singing, a prompt is displayed in area F and the song lyrics along with the highlighted words are shown in area G. During song play, as shown in FIG. 12C, the start singing prompt goes away and the song lyrics and highlights are shown on the entire area G.

Of course, the screens shown are merely by way of example. Any other aesthetically pleasing or functional screen configurations may be used without departing from the spirit and scope of the present invention. Further, it will be obvious to one of skill in the art that as screen technology improves, more visual affects and other screen configurations including graphic images as background on the internal display 110 may be desirable and preferably used.

The foregoing description of specific embodiments of the invention has been presented for the purposes of illustration and description. It is not intended to be exhaustive or to limit the invention to the precise form described. Many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. It is intended that the scope of the invention be defined only by the claims appended hereto.

What is claimed is:

1. A music reproduction apparatus comprising:

a first memory;

a second memory that is programmable, wherein data may be stored in both the first memory and the second memory;

a port coupled to the second memory, wherein the second memory may be programmed with new audio data through said port;

a processing unit for producing an image and an audio signal from the data stored in either the first memory or the second memory;

a display unit for displaying the image; and an audio output for outputting the audio signal.

2. The music reproduction apparatus of claim 1 wherein the data includes one or more of the set consisting of audio data, voice data, sound data, program data, game program data, text data, lyric data, and graphic data.

3. The music reproduction apparatus of claim 1 wherein the second memory is removable by a user.

4. The music reproduction apparatus of claim 3 wherein the second memory is an integrated circuit module.

5. The music reproduction apparatus of claim 1 further comprising:

a programming device coupled to the port, wherein the second memory may be programmed with data by the programming device.

6. The music reproduction apparatus of claim 5 wherein the programming device is one of the group consisting of a personal computer, a set-top box, and an Internet connection.

7. The music reproduction apparatus of claim 6 wherein the internet connection is a modem.

8. The music reproduction apparatus of claim 1 wherein the port is one of a group consisting of a Universal Serial Bus interface, an RS 232 interface, a serial interface, a parallel interface, an IRDA, and an RF interface.

9. The music reproduction apparatus of claim 1 wherein the first memory stores program data to control the operation of the processing unit.

10. The music reproduction apparatus of claim 1 wherein the image produced by the processing unit includes a graphic image.

11. The music reproduction apparatus of claim 10 wherein the processing unit produces the graphic image from data stored in the first memory.

12. The music reproduction apparatus of claim 11 wherein the processing unit produces the graphic image from data stored in the second memory.

13. The music reproduction apparatus of claim 1 wherein the image produced by the processing unit includes text.

14. The music reproduction apparatus of claim 1 wherein the image produced by the processing unit includes text superimposed on a graphic image.

15. The music reproduction apparatus of claim 1 further comprising a video input for receiving a video image, whereby the image includes the video image from the video input.

16. The music reproduction apparatus of claim 15 wherein the processor unit produces text and the image includes the text superimposed on the video image from the video input.

17. The music reproduction apparatus of claim 1 wherein the data is compressed.

18. The music reproduction apparatus of claim 1 further comprising a decompression module for decompressing data.

19. The music reproduction apparatus of claim 1 further comprising:
a headset connector for connecting a headset to the audio output;
a speaker connector for connecting a speaker to the audio output; and
a transmitter for transmitting the audio signals wirelessly to an external speaker.

20. The music reproduction apparatus of claim 19 wherein the transmitter operates as an FM transmitter.

21. The music reproduction apparatus of claim 19 wherein the audio signals may be output on at least two of the headset connector, the speaker connector, and the transmitter substantially simultaneously.

22. The music reproduction apparatus of claim 1 wherein the display unit is physically enclosed in a housing containing the processing unit.

23. The music reproduction apparatus of claim 22 wherein the display unit is an LCD display.

24. The music reproduction apparatus of claim 22 further comprising:
a video port for outputting the image; and
an external display unit for displaying the image.

25. The music reproduction apparatus of claim 1 further comprising a key pad for receiving user instructions.

26. The music reproduction apparatus of claim 1 further comprising a remote control receiver for receiving user instructions.

27. The music reproduction apparatus of claim 1 wherein the apparatus is portable.

28. The music reproduction apparatus of claim 1 wherein the new audio data is downloadable from the Internet and stored in the programmable memory.

29. The music reproduction apparatus of claim 1 wherein the data includes program data and the processing unit executes the program data from the second memory.

30. The music reproduction apparatus of claim 1 wherein the first memory is a read-only memory and the second memory is a non-volatile memory.

31. The music reproduction apparatus of claim 1 wherein the image comprises lyrics corresponding to the audio data.

32. A karaoke unit comprising:
a memory for storing data;
a port for receiving new audio data and storing said new audio data in the memory;
a microphone input for coupling to a microphone;
a processor for producing a audio signal from the data stored in the memory;
a mixer for mixing the music signals with a signal from the microphone input to form a mixed audio signal; and
a transmitter for transmitting the mixed audio signal over radio frequencies.

33. The karaoke unit of claim 32 further comprising:
a first memory integrated within the karaoke unit; and
a second memory that is removably coupled to the karaoke unit, wherein the processor may produce the audio signal from data on either the first memory or the second memory.

34. The karaoke unit of claim 32 further comprising a remote control sensor for receiving user commands from a remote control device.

35. A music reproduction apparatus comprising:
a memory for storing data;
a microphone input for coupling to a microphone;
a processor for producing a audio signal from the data stored in the memory;
a mixer for mixing the music signals with a signal from the microphone input to form a mixed audio signal;
a transmitter for transmitting the mixed audio signal over radio frequencies;
a first memory integrated within the karaoke unit;
a second memory that is removably coupled to the karaoke unit, wherein the processor may produce the audio signal from data on either the first memory or the second memory; and
a port coupled to the second memory for receiving audio data and storing the audio data in the second memory.

36. A music reproduction apparatus comprising:
a first memory;
a second memory that is programmable, wherein audio data may be stored in both the first memory and the second memory;
a port coupled to the second memory for receiving new audio data, wherein the new audio data may be programmed into the second memory;
a processing unit coupled to the first and second memories for producing an audio signal from the audio data in either the first or second memories; and
an audio output coupled to the processing unit for outputting the audio signal.

37. The music reproduction apparatus of claim 36 wherein the second memory is non-volatile memory.

38. The music reproduction apparatus of claim 36 wherein the port is coupled to the Internet and the audio data is downloaded to the port from the Internet.

* * * * *